(12) United States Patent
Yin et al.

(10) Patent No.: US 12,317,225 B2
(45) Date of Patent: May 27, 2025

(54) COMMUNICATION METHOD AND APPARATUS

(71) Applicant: Huawei Technologies Co., Ltd., Shenzhen (CN)

(72) Inventors: Yu Yin, Shanghai (CN); Caixia Qi, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 369 days.

(21) Appl. No.: 17/848,819

(22) Filed: Jun. 24, 2022

(65) Prior Publication Data
US 2022/0322282 A1 Oct. 6, 2022

Related U.S. Application Data

(63) Continuation of application No. PCT/CN2020/118968, filed on Sep. 29, 2020.

(30) Foreign Application Priority Data

Dec. 31, 2019 (CN) .......................... 201911417853.4

(51) Int. Cl.
*H04W 68/00* (2009.01)
*H04W 4/021* (2018.01)
*H04W 4/029* (2018.01)

(52) U.S. Cl.
CPC ......... *H04W 68/005* (2013.01); *H04W 4/021* (2013.01); *H04W 4/029* (2018.02)

(58) Field of Classification Search
CPC ... H04W 68/005; H04W 4/021; H04W 4/029; H04W 48/10; H04W 60/00; H04W 40/20; H04W 76/12; H04W 76/34; H04W 16/18

(Continued)

(56) References Cited

U.S. PATENT DOCUMENTS

2011/0021212 A1* 1/2011 Chen ................... H04W 4/02
455/456.3
2014/0331272 A1* 11/2014 Gupta .................. H04W 4/021
726/1

(Continued)

FOREIGN PATENT DOCUMENTS

CN 109302701 A 2/2019
CN 109842535 A 6/2019

(Continued)

OTHER PUBLICATIONS

Fraunhofer Iis et al., "NR positioning requirements for commercial use cases", 3GPP TSG RAN WG1 Meeting #94bis, R1-1811464, Chengdu, China, Oct. 8-12, 2018, 6 pages.

*Primary Examiner* — Don N Vo
(74) *Attorney, Agent, or Firm* — Slater Matsil, LLP

(57) ABSTRACT

This application provides a communication method and apparatus. The method includes: A terminal device receives information about an enhanced service area allowed to be accessed, where the information about the enhanced service area allowed to be accessed includes information about one or more enhanced service areas; the terminal device receives information about a first enhanced service area corresponding to a first area from an access node after entering the first area; and the terminal device determines that the terminal device is allowed to access the first enhanced service area based on the information about the enhanced service area allowed to be accessed and the information about the first enhanced service area.

20 Claims, 4 Drawing Sheets

(58) Field of Classification Search
USPC .................................................. 455/456.1
See application file for complete search history.

(56) References Cited

U.S. PATENT DOCUMENTS

| | | | |
|---|---|---|---|
| 2015/0181373 A1* | 6/2015 | Xie | H04W 4/02 |
| | | | 455/406 |
| 2019/0199860 A1* | 6/2019 | Vikberg | H04W 4/50 |
| 2019/0229935 A1 | 7/2019 | Li et al. | |
| 2020/0288378 A1 | 9/2020 | Yin et al. | |
| 2021/0314849 A1* | 10/2021 | Tiwari | H04W 48/04 |

FOREIGN PATENT DOCUMENTS

| | | |
|---|---|---|
| CN | 110149665 A | 8/2019 |
| CN | 110167102 A | 8/2019 |

\* cited by examiner

COMMUNICATION METHOD AND APPARATUS

CROSS-REFERENCE TO RELATED APPLICATIONS

This application is a continuation of International Application No. PCT/CN2020/118968, filed on Sep. 29, 2020, which claims priority to Chinese Patent Application No. 201911417853.4, filed on Dec. 31, 2019. The disclosures of the aforementioned applications are hereby incorporated by reference in their entireties.

TECHNICAL FIELD

This application relates to the field of communication technologies, and in particular, to a communication method and apparatus.

BACKGROUND

In a mobile communication network, a terminal device, a network node, or an application server may need to know that the terminal device is located in a specific location area, so as to trigger a specific operation.

In the conventional technology, a specific location area may be identified by using one or more area identities. The area identity may be a tracking area identity (TAI) or a cell identity (CI). The tracking area identity is used to identify a tracking area, and the cell identity is used to identify a cell. For example, if a location area 1 corresponds to a cell 1 and a cell 2, the location area 1 may be identified by using an identity of the cell 1 and an identity of the cell 2.

During network planning, a factor such as wireless network coverage is mainly considered for tracking area or cell division. For example, during tracking area planning, factors such as independent planning of urban areas and suburban areas, geographical area continuity, and mountains or rivers serving as boundaries are considered. For example, during cell planning, a cell coverage radius of a macro network is usually 400 meters in an urban area or 700 meters in a suburban area. Therefore, when a tracking area is used to define a specific location area, the tracking area is sometimes large, and is difficult to match the specific location area. When a cell is used to define a location area, the specific location area may include a large quantity of cells. When notifying a terminal device of a location area, a network node or an application server needs to send a large quantity of cell identities to the terminal device. Consequently, signaling overheads are increased.

SUMMARY

Embodiments of this application provide a communication method and apparatus, to resolve the foregoing problem.

According to a first aspect, an embodiment of this application provides a communication method, including: receiving information about an enhanced service area allowed to be accessed, where the information about the enhanced service area allowed to be accessed includes information about one or more enhanced service areas, and the information about the enhanced service area includes an enterprise differentiator identifier used to identify an enterprise; after a terminal device enters a first area, receiving information about a first enhanced service area corresponding to the first area from an access node; and determining that the terminal device is allowed to access the first enhanced service area based on the information about the enhanced service area allowed to be accessed and the information about the first enhanced service area.

In a possible implementation, a correspondence between each cell served by the access node and information about an enhanced service area is configured on the access node. The access node sends, through broadcasting, a cell identity and information about an enhanced service area corresponding to the cell identity to a terminal device in a cell. For example, when the terminal device enters the first area, where the first area may be a cell in which the terminal device is currently located, the terminal device may receive a cell identity (which may also be referred to as an identity of the first area) sent through broadcasting by the access node in the first area and information about an enhanced service area (that is, the information about the first enhanced service area) corresponding to the cell identity, and the terminal device may learn of the cell in which the terminal device is currently located and the information about the enhanced service area in which the terminal device is currently located.

In this embodiment of this application, information about one enhanced service area may correspond to one or more cell identities, and one cell identity may correspond to one or more enhanced service areas. Therefore, the information about the first enhanced service area received by the terminal device from the access node may be information about one enhanced service area, or may be information about a plurality of enhanced service areas.

It should be noted that, in this embodiment of this application, information about one enhanced service area may further correspond to one or more tracking area identities, and one tracking area identity may correspond to one or more enhanced service areas.

Based on the foregoing solution, this embodiment of this application introduces the enhanced service area, and a network side only needs to send the information about the enhanced service area allowed to be accessed by the terminal device to the terminal device. Compared with the prior-art technical solution in which a plurality of tracking area identities are sent to the terminal device, this embodiment of this application has an advantage that the enhanced service area can well match a coverage range of an enterprise. Compared with the prior-art technical solution in which a plurality of cell identities are sent to the terminal device, this embodiment of this application has an advantage that overheads caused by sending the information about the enhanced service area to the terminal device are less than overheads caused by sending the cell identities to the terminal device. In addition, because a plurality of noncontiguous location areas of the same enterprise correspond to a same enterprise differentiator identifier, function complexity and signaling overheads are reduced.

In a possible implementation, the information about the enhanced service area allowed to be accessed by the terminal device may be configured on a network node, a policy function node, or an application server. Information about an enhanced service area and a corresponding cell identity or tracking area identity are configured on the access node. In addition, when a cell identity or a tracking area identity corresponding to information about an enhanced service area of an enterprise is updated, only a correspondence needs to be updated on the access node, and a new correspondence does not need to be sent to the terminal device. This can reduce signaling overheads.

According to this solution, the network node, the policy function node, the application server, and the terminal device all need to learn of only the information about the enhanced service area, and do not need to learn of an actual corresponding cell identity or tracking area identity. This can avoid impact on the network node, the policy function node, the application server, and the terminal device when the cell identity or the tracking area identity corresponding to the enhanced service area is adjusted during wireless network planning. A correspondence between information about an enhanced service area and a cell identity or a tracking area identity is configured on the access node. The access node sends, to the terminal device through broadcasting, the cell identity of the cell in which the terminal device is currently located and the information about the enhanced service area corresponding to the cell identity, and the terminal device may learn of the information about the enhanced service area corresponding to the area that the terminal device currently enters. This reduces signaling overheads and complexity.

In a possible implementation, the determining that the terminal device is allowed to access the first enhanced service area based on the information about the enhanced service area allowed to be accessed and the information about the first enhanced service area includes: when determining that the information about the first enhanced service area matches the information about the enhanced service area allowed to be accessed, determining that the terminal device is allowed to access the first enhanced service area.

In a possible implementation, that the information about the first enhanced service area matches the information about the enhanced service area allowed to be accessed includes: An enterprise differentiator identifier in the information about the first enhanced service area is the same as an enterprise differentiator identifier in information about at least one enhanced service area in the information about the enhanced service area allowed to be accessed.

In a possible implementation, the information about the enhanced service area further includes at least one sub-area identity, the sub-area identity is used to indicate a sub-area of an enterprise, and the information about the first enhanced service area further includes a first sub-area identity. That the information about the first enhanced service area matches the information about the enhanced service area allowed to be accessed includes: An enterprise differentiator identifier in the information about the first enhanced service area is the same as an enterprise differentiator identifier in information about at least one enhanced service area in the information about the enhanced service area allowed to be accessed, and the first sub-area identity is the same as a sub-area identity in the information about the at least one enhanced service area.

In a possible implementation, the receiving information about an enhanced service area allowed to be accessed includes: receiving, from the network node in a registration procedure, an attach procedure, a location area update procedure, or a configuration update procedure of the terminal device, the information about the enhanced service area allowed to be accessed; receiving a user policy from the policy function node, where the user policy includes the information about the enhanced service area allowed to be accessed; or receiving a service data packet from the application server, where the service data packet includes the information about the enhanced service area allowed to be accessed.

In a possible implementation, after the determining that the terminal device is allowed to access the first enhanced service area, the method further includes: triggering establishment of a protocol data unit PDU session, to establish a connection to a data network corresponding to the first enhanced service area.

In a possible implementation, after the determining that the terminal device is allowed to access the first enhanced service area, the method further includes: sending a first notification message to the application server, where the first notification message includes the information about the first enhanced service area, and the first notification message is used to notify that the terminal device enters the first enhanced service area.

In a possible implementation, after the determining that the terminal device is allowed to access the first enhanced service area, the method further includes: sending a second notification message to the network node, where the second notification message includes the information about the first enhanced service area, and the second notification message is used to notify that the terminal device enters the first enhanced service area; receiving, from the network node, information about a local network corresponding to the first enhanced service area; and triggering establishment of a PDU session based on the information about the local network, to establish a connection to the local network corresponding to the first enhanced service area.

In a possible implementation, the terminal device is located in a second area before entering the first area, and the second area corresponds to information about a second enhanced service area. The method further includes: determining that the terminal device moves out of the second enhanced service area based on the information about the first enhanced service area and the information about the second enhanced service area.

In a possible implementation, the determining that the terminal device moves out of the second enhanced service area based on the information about the first enhanced service area and the information about the second enhanced service area includes: when determining that the enterprise differentiator identifier in the information about the first enhanced service area is different from an enterprise differentiator identifier in the information about the second enhanced service area, determining that the terminal device moves out of the second enhanced service area; or when determining that the enterprise differentiator identifier in the information about the first enhanced service area is the same as an enterprise differentiator identifier in the information about the second enhanced service area, but a sub-area identity in the information about the first enhanced service area is different from a sub-area identity in the information about the second enhanced service area, determining that the terminal device moves out of the second enhanced service area.

In a possible implementation, after the determining that the terminal device moves out of the second enhanced service area, the method further includes: triggering deletion of a PDU session established in the second enhanced service area, to disconnect from a data network corresponding to the second enhanced service area.

In a possible implementation, after the determining that the terminal device moves out of the second enhanced service area, the method further includes: sending a third notification message to the application server and/or the network node, where the third notification message includes the information about the second enhanced service area, and the third notification message is used to notify that the terminal device moves out of the second enhanced service area.

In a possible implementation, information about one enhanced service area corresponds to one or more cell identities; or information about one enhanced service area corresponds to one or more tracking area identities.

According to a second aspect, an embodiment of this application provides a communication apparatus. The apparatus may be a terminal device, or may be a chip used in a terminal device. The apparatus has functions of implementing the first aspect or each implementation of the first aspect. The function may be implemented by hardware, or may be implemented by hardware executing corresponding software. The hardware or the software includes one or more modules corresponding to the function.

According to a third aspect, an embodiment of this application provides a communication apparatus, including a processor and a memory. The memory is configured to store computer-executable instructions. When the apparatus runs, the processor executes the computer-executable instructions stored in the memory, to enable the apparatus to perform the method in the first aspect or each implementation of the first aspect.

According to a fourth aspect, an embodiment of this application provides a communication apparatus, including a unit or means configured to perform the steps in the first aspect or each implementation of the first aspect.

According to a fifth aspect, an embodiment of this application provides a communication apparatus, including a processor and an interface circuit. The processor is configured to communicate with another apparatus through the interface circuit, and perform the method in the first aspect or each implementation of the first aspect. There are one or more processors.

According to a sixth aspect, an embodiment of this application provides a communication apparatus, including a processor, configured to: connect to a memory, and invoke a program stored in the memory, to perform the method in the first aspect or each implementation of the first aspect. The memory may be located inside or outside the apparatus. In addition, there are one or more processors.

According to a seventh aspect, an embodiment of this application further provides a computer-readable storage medium. The computer-readable storage medium stores instructions, and when the instructions are run on a computer, a processor is enabled to perform the method in the first aspect or each implementation of the first aspect.

According to an eighth aspect, an embodiment of this application further provides a computer program product including instructions. When a program is invoked by a processor, the method in the first aspect or each implementation of the first aspect is performed.

According to a ninth aspect, an embodiment of this application further provides a chip system, including a processor, configured to perform the method in the first aspect or each implementation of the first aspect.

DETAILED DESCRIPTION OF ILLUSTRATIVE EMBODIMENTS

Figure 1:
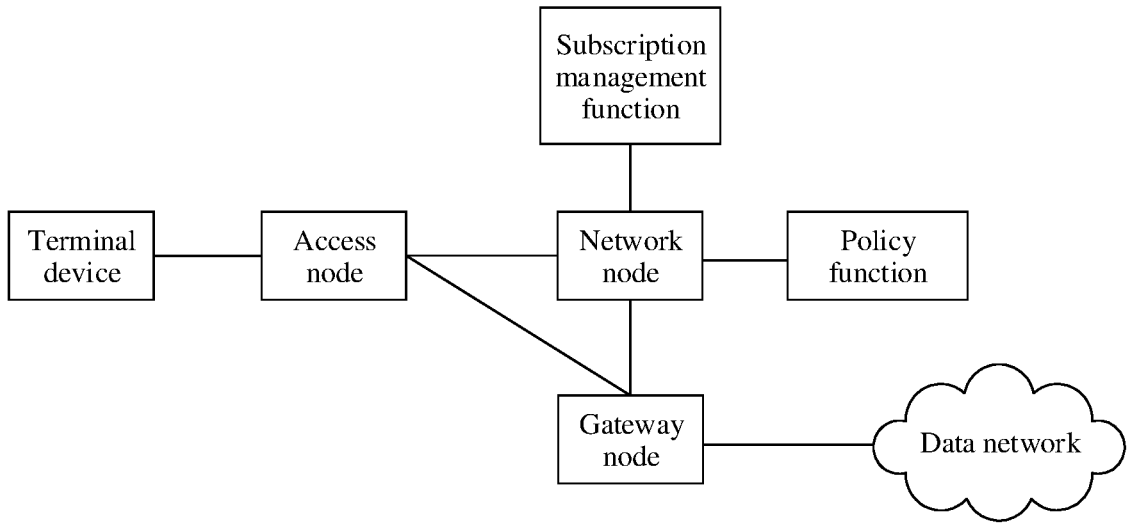
FIG. 1 is a schematic diagram of a logical architecture of a mobile communication network.

FIG. 1 is a schematic diagram of a logical architecture of a mobile communication network. The architecture includes but is not limited to a terminal device, an access node, a network node, a gateway node, a subscription management function node, a policy function node, and an application server.

The terminal device accesses a wireless network via the access node at a current location.

The network node is configured to perform device registration, security authentication, mobility management, location management, and the like on the terminal device.

The gateway node is configured to forward a data packet between the terminal device and a data network.

The subscription management function node is configured to perform functions such as subscription data management and authentication on the terminal device.

The policy function node is configured to perform policy control over the terminal device such as charging and quality of service (QoS).

The application server is located in the data network, and is configured to provide an application service for the terminal device.

The architecture shown in FIG. 1 may correspond to a 4th generation (4G) mobile communication network. The network node may be a mobility management entity (MME). The gateway node may be a serving gateway (SGW), or a packet data network gateway (PDN-GW). The subscription management function node may be a home subscriber server (HSS). The policy function node may be a policy and charging rules function (PCRF) network element.

The architecture shown in FIG. 1 may also correspond to a 5th generation (5G) mobile communication network. The network node may be an access and mobility management function (AMF) network element or a session management function (SMF) network element. The gateway node may be a user plane function (UPF) network element. The subscription management function node may be a unified data management (UDM) network element. The policy function node may be a policy control function (PCF) network element.

The architecture shown in FIG. 1 may also correspond to a future mobile communication network, for example, a 6th generation (6G) mobile communication network. This is not limited in this embodiment of this application.

In this embodiment of this application, the terminal device is a device that has a wireless transceiver function, and the terminal device may be deployed on land, including an indoor or outdoor device, a hand-held device, or a vehicle-mounted device, or may be deployed on water (for example, on a ship), or may be deployed in the air (for example, on a plane, a balloon, or a satellite). The terminal device may be a mobile phone, a tablet computer (pad), a computer having a wireless transceiver function, a virtual reality (VR) terminal, an augmented reality (AR) terminal, a wireless terminal in industrial control, a wireless terminal in self driving, a wireless terminal in telemedicine (remote medical), a wireless terminal in a smart grid, a wireless terminal in transportation safety, a wireless terminal in a smart city, a wireless terminal in a smart home, user equipment (UE), or the like.

In the mobile communication network, the terminal device, the network node, or the application server may need to know that the terminal device is located in a specific location area, so as to trigger a specific operation.

For example, after learning that the terminal device enters the specific location area, the terminal device may trigger establishment of a protocol data unit (PDU) session.

For another example, for a local network, after the network node learns that the terminal device enters a location area corresponding to the local network, the network node may send information such as a data network name (DNN) corresponding to the local network to the terminal device, so that the terminal device establishes a PDU session to the local network.

For another example, for mobile edge computing (MEC), after learning that the terminal device enters the specific location area, the network node may trigger traffic offloading, and select a user plane function (UPF), that is, an uplink classifier (UL CL), that performs the traffic offloading to forward a specific service flow at a location close to an access location of the terminal device.

For another example, after determining that the terminal device is located in the specific location area, the application server may push location area-related application information to the terminal device.

In the conventional technology, a specific location area may be identified by using one or more area identities. The area identity may be a tracking area identity (TAU, or a cell identity (CI). The tracking area identity is used to identify a tracking area, and the cell identity is used to identify a cell. For example, if a location area 1 corresponds to a cell 1 and a cell 2, the location area 1 may be identified by using an identity of the cell 1 and an identity of the cell 2.

During network planning, a factor such as wireless network coverage is mainly considered for tracking area or cell division. For example, during tracking area planning, factors such as independent planning of urban areas and suburban areas, geographical area continuity, and mountains or rivers serving as boundaries are considered. For example, during cell planning, a cell coverage radius of a macro network is usually 400 meters in an urban area or 700 meters in a suburban area. Therefore, when a tracking area is used to define a specific location area, the tracking area is sometimes large, and is difficult to match the specific location area. When a cell is used to define a location area, the specific location area may include a large quantity of cells. When notifying a terminal device of a location area, a network node or an application server needs to send a large quantity of cell identities to the terminal device. Consequently, signaling overheads are increased.

In addition, during wireless network planning, a tracking area or a cell may need to be frequently adjusted based on a factor such as signal strength, and a tracking area identity or a cell identity corresponding to the specific location area changes accordingly. A network node or an application server needs to learn of a change of a tracking area identity or a cell identity in time, and needs to re-send a tracking area identity or a cell identity corresponding to the specific location area to the terminal device. Consequently, extra signaling overheads are caused.

Figure 2:
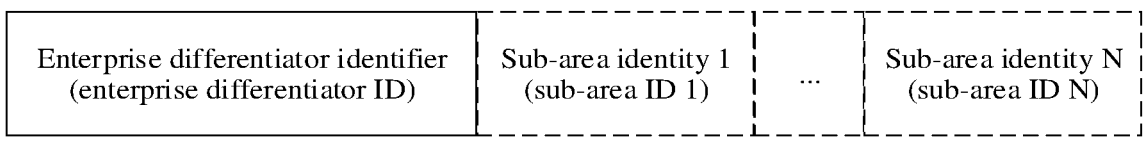
FIG. 2 is a schematic diagram of information about an enhanced service area according to an embodiment of this application.

To resolve the foregoing problems, embodiments of this application introduce an enhanced service area. As shown in FIG. 2, information about an enhanced service area includes one enterprise differentiator identifier (enterprise differentiator ID), and optionally includes N sub-area identities (sub-area ID), where N is a positive integer. The information about the enhanced service area is used to identify an enhanced service area, that is, a specific location area.

The enterprise differentiator identifier is used to identify an enterprise, and different enterprise differentiator identifiers are used to identify different enterprises. The enterprise differentiator identifier may be an enterprise name, an enterprise identifier, or the like. The enterprise may be a place covering a specific location area, such as a shopping mall, a company, a library, a cinema, a stadium, a school, an airport, or a railway station.

The sub-area identity is used to identify a sub-area of an enterprise. Different sub-area identities corresponding to a same enterprise differentiator identifier are used to identify different sub-areas of the same enterprise, for example, identify a branch of a company or a branch of a school. The sub-area identity may be a location name (for example, Shanghai or Beijing) of a branch of an enterprise or an identifier of the branch of the enterprise.

It should be noted that branches of the enterprise herein mean different branch offices of the same enterprise that are differentiated according to geographical locations. For example, if a head office of an enterprise AAA is in Beijing and the enterprise has four branch offices in Chengdu, Shanghai, Shenzhen, and Nanjing, the enterprise may include five branch offices in Beijing, Chengdu, Shanghai, Shenzhen, and Nanjing.

Based on the network architecture shown in FIG. 1, an embodiment of this application provides a communication method. In the method, after a terminal device enters a first area, the terminal device determines, based on information about a first enhanced service area corresponding to the first area and information about an enhanced service area allowed to be accessed, that the terminal device has entered the first enhanced service area and is allowed to access the first enhanced service area, and performs a corresponding operation.

Figure 3:
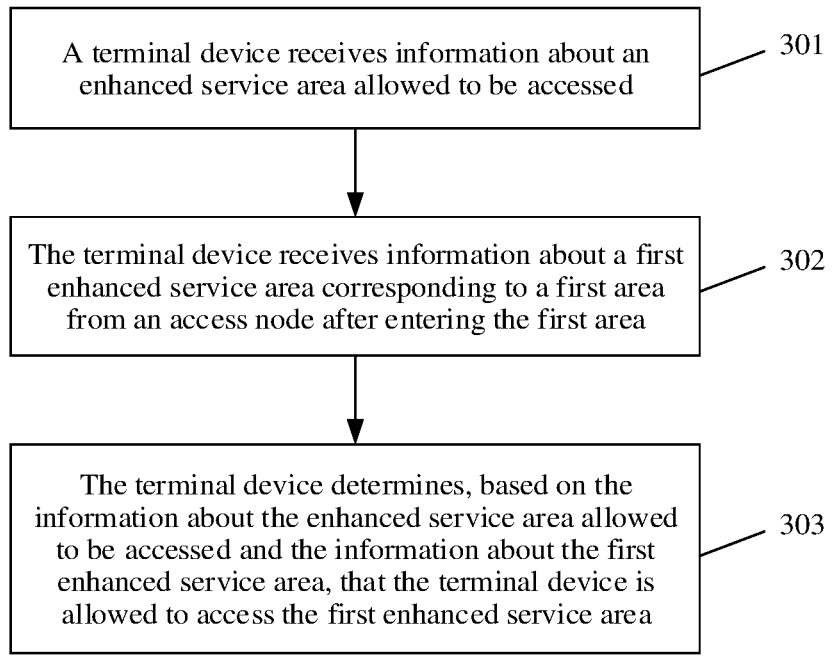
FIG. 3 is a schematic flowchart of another communication method according to an embodiment of this application.

As shown in FIG. 3, the method includes the following steps.

Step 301: The terminal device receives the information about the enhanced service area allowed to be accessed.

The enhanced service area allowed to be accessed includes one or more enhanced service areas.

In an implementation, the terminal device may receive, from a network node, the information about the enhanced service area allowed to be accessed. For example, in a registration procedure, an attach procedure, a location area update procedure, or a configuration update procedure of the terminal device, the network node sends, to the terminal device, the information about the enhanced service area allowed to be accessed. Optionally, the information about the enhanced service area allowed to be accessed may be sent to the terminal device in a form of a list of information about an enhanced service area, and the list includes information about one or more enhanced service areas.

In another implementation, the terminal device may alternatively receive, from a policy function node, the information about the enhanced service area allowed to be accessed. In other words, the policy function node sends, to the terminal device, the information about the enhanced service area allowed to be accessed. For example, the policy function node sends a user policy to the terminal device. The user policy carries the information about the enhanced service area allowed to be accessed. Optionally, the information about the enhanced service area allowed to be accessed may be sent to the terminal device in a form of a list of information about an enhanced service area, and the list includes information about one or more enhanced service areas.

In another implementation, the terminal device may alternatively receive, from an application server, the information about the enhanced service area allowed to be accessed. In other words, the application server sends, to the terminal device, the information about the enhanced service area allowed to be accessed. In an example, after a user starts an application (APP) on the terminal device and performs login, an application server corresponding to the APP sends a service data packet to the terminal device. The service data packet carries the information about the enhanced service area allowed to be accessed. Optionally, the information about the enhanced service area allowed to be accessed may be sent to the terminal device in a form of a list of information about an enhanced service area, and the list includes information about one or more enhanced service areas.

The following provides descriptions with reference to examples. For example, an enterprise AAA has branches in Shenzhen, Shanghai, Nanjing, Beijing, Guangzhou, and Hangzhou; an enterprise BBB has branches in Hong Kong, Guangzhou, Shanghai, and Sichuan; and an enterprise CCC has branches in Chongqing, Guangzhou, Kunming, and Sichuan. One branch of an enterprise corresponds to one area, and one area corresponds to one or more cells or one or more tracking areas.

Example 1

Information that is about enhanced service areas allowed to be accessed and that is obtained by UE 1 includes: {AAA, Shenzhen}; {AAA, Shanghai}; {BBB, Shanghai}; {BBB, Sichuan}.

AAA and BBB are enterprise differentiator identifiers, and Shenzhen, Shanghai, and Sichuan are sub-area identities. The Shenzhen branch of the enterprise AAA is referred to as an enhanced service area or a specific location area. The Shanghai branch of the enterprise AAA is referred to as an enhanced service area or a specific location area. The Shanghai branch of the enterprise BBB is referred to as an enhanced service area or a specific location area. The Sichuan branch of the enterprise BBB is referred to as an enhanced service area or a specific location area.

Therefore, the UE 1 is allowed to access enterprise networks of the Shenzhen branch and the Shanghai branch of the enterprise AAA, and enterprise networks of the Shanghai branch and the Sichuan branch of the enterprise BBB.

Example 2

Information that is about enhanced service areas allowed to be accessed and that is obtained by UE 2, includes: {AAA}; {CCC, Chongqing}; {CCC, Kunming}.

AAA and CCC are enterprise differentiator identifiers, and Chongqing and Kunming are sub-area identities. All branches (including Shenzhen, Shanghai, Nanjing, Beijing, Guangzhou, and Hangzhou) of the enterprise AAA are used as an enhanced service area or a specific location area as a whole. The Chongqing branch of the enterprise CCC is referred to as an enhanced service area or a specific location area. The Kunming branch of the enterprise CCC is referred to as an enhanced service area or a specific location area.

Therefore, the UE 2 is allowed to access enterprise networks of all branches (including Shenzhen, Shanghai, Nanjing, Beijing, Guangzhou, and Hangzhou) of the enterprise AAA and enterprise networks of the Chongqing branch and the Kunming branch of the enterprise CCC.

It should be noted that, if a terminal device is allowed to access enterprise networks of a plurality of branches of an enterprise, in an implementation, information about a plurality of enhanced service areas may be used to respectively indicate the branches whose enterprise networks are allowed to be accessed. The foregoing Example 1 is used as an example. If the UE 1 is allowed to access enterprise networks of the Shenzhen branch and the Shanghai branch of the enterprise AAA, information about two enhanced service areas is used to respectively indicate the Shenzhen branch and the Shanghai branch of the enterprise AAA and whose enterprise networks are allowed to be accessed.

If a terminal device is allowed to access enterprise networks of a plurality of branches of an enterprise, in another implementation, information about one enhanced service area may alternatively be used to indicate all the branches whose enterprise networks are allowed to be accessed. The foregoing Example 1 is used as an example. If the UE 1 is allowed to access enterprise networks of the Shenzhen branch and the Shanghai branch of the enterprise AAA, information about one enhanced service area is alternatively used to indicate the Shenzhen branch and the Shanghai branch of the enterprise AAA that are allowed to be accessed, for example, {AAA, Shenzhen, Shanghai}. Therefore, the foregoing Example 1 may be replaced with: {AAA, Shenzhen, Shanghai}; {BBB, Shanghai}; {BBB, Sichuan}.

AAA and BBB are enterprise differentiator identifiers, and Shenzhen, Shanghai, and Sichuan are sub-area identities. The Shenzhen branch and the Shanghai branch of the enterprise AAA are used as an enhanced service area or a specific location area as a whole. The Shanghai branch of the enterprise BBB is referred to as an enhanced service area or a specific location area. The Sichuan branch of the enterprise BBB is referred to as an enhanced service area or a specific location area. Therefore, in this embodiment of this application, if a terminal device is allowed to access enterprise networks of a plurality of branches of an enterprise, information about one enhanced service area may be used to indicate all the branches whose enterprise networks are allowed to be accessed; or information about a plurality of enhanced service areas may be used to indicate all the branches whose enterprise networks are allowed to be accessed, and information about one enhanced service area indicates one or more branches in all the branches whose enterprise networks are allowed to be accessed.

Step 302: After the terminal device enters the first area, the terminal device receives the information about the first enhanced service area corresponding to the first area from an access node.

The first area may be a cell in which the terminal device is currently located.

For example, the access node corresponding to the first area sends a system broadcast message, where the message carries the information about the first enhanced service area corresponding to the first area and an identity of the first area. After entering the first area, the terminal device may receive the system broadcast message, and obtain, from the system broadcast message, the identity of the first area and the information about the first enhanced service area corresponding to the first area, and then the terminal device learns that the terminal device is currently located in the first area, and determines, based on the information about the first enhanced service area corresponding to the first area, that the terminal device enters the first enhanced service area.

For example, a coverage range of the Shenzhen branch of the enterprise AAA includes a cell 1. After entering the cell 1, the terminal device receives a system broadcast message from an access node corresponding to the cell 1, where the system broadcast message carries {cell $ID_1$, {AAA, Shenzhen}}. Therefore, the terminal device can learn that the terminal device enters the cell 1 and the Shenzhen branch of the enterprise AAA.

Step 303: The terminal device determines, based on the information about the enhanced service area allowed to be accessed and the information about the first enhanced service area, that the terminal device is allowed to access the first enhanced service area.

Herein, allowing the terminal device to enter the first enhanced service area means that the terminal device is allowed to trigger a specific operation in the first enhanced service area, for example, the terminal device is allowed to access a local network corresponding to the first enhanced service area, or the terminal device is allowed to access an application corresponding to the first enhanced service area.

In an implementation, when the information about the first enhanced service area matches information about any enhanced service area in the information about the enhanced service area allowed to be accessed, the terminal device determines that the terminal device is allowed to access the first enhanced service area. The matching herein at least means that enterprise differentiator identifiers are the same, and optionally means that sub-area identities are the same.

For example, the UE 1 in Example 1 in step 301 is used as an example. After entering a cell (namely, the first area) within the coverage range of the Shenzhen branch of the enterprise AAA, the UE 1 may receive the system broadcast message sent by the access node corresponding to the first area. For example, the information that is about the first enhanced service area and that is carried in the system broadcast message includes {AAA, Shenzhen}. Because a first piece of information about an enhanced service area in the information about the enhanced service area allowed to be accessed includes {AAA, Shenzhen}, an enterprise differentiator identifier AAA in the information about the first enhanced service area is the same as an enterprise differentiator identifier AAA in the first piece of information about the enhanced service area, and a sub-area identity Shenzhen in the information about the first enhanced service area is the same as a sub-area identity Shenzhen in the first piece of information about the enhanced service area in the information about the enhanced service area allowed to be accessed. To be specific, the information about the first enhanced service area matches the first piece of information about the enhanced service area in the information about the enhanced service area allowed to be accessed. Then, the UE 1 determines that the UE 1 is allowed to access the Shenzhen branch of the enterprise AAA.

For example, the UE 2 in Example 2 in step 301 is used as an example. After entering a cell (namely, the first area) within the coverage range of the Shenzhen branch of the enterprise AAA, the UE 2 may receive the system broadcast message sent by the access node corresponding to the first area. For example, the information that is about the first enhanced service area and that is carried in the system broadcast message includes {AAA, Shenzhen}. Because a first piece of information about an enhanced service area in the information about the enhanced service area allowed to be accessed includes {AAA}, an enterprise differentiator identifier AAA in the information about the first enhanced service area is the same as an enterprise differentiator AAA in the first piece of information about the enhanced service area in the information about the enhanced service area allowed to be accessed. To be specific, the information about the first enhanced service area matches the first piece of information about the enhanced service area in the information about the enhanced service area allowed to be accessed. Then, the UE 2 determines that the UE 2 is allowed to access the Shenzhen branch of the enterprise AAA.

After determining that the terminal device is allowed to access the first enhanced service area, the terminal device may perform a corresponding operation. The operation performed by the terminal device includes but is not limited to one or more of the following:

Operation 1: After determining that the terminal device is allowed to access the first enhanced service area, the terminal device may trigger establishment of a protocol data unit (protocol data unit, PDU) session, to establish a connection to a data network corresponding to the first enhanced service area.

For a PDU session establishment procedure, refer to the conventional technology. Details are not described herein.

Operation 2: When the application server needs to learn of the terminal device in the first enhanced service area, to perform an operation such as statistics collection on pedestrian flow in the first enhanced service area, statistics collection on a quantity of employees in the first enhanced service area, or service push to the terminal device in the first enhanced service area, after determining that the terminal device is allowed to access the first enhanced service area, the terminal device may send a notification message to the application server, where the notification message includes the information about the first enhanced service area, and the notification message is used to notify the application server that the terminal device enters the first enhanced service area.

Optionally, the terminal device may send a service data packet to the application server, where the service data packet carries the information about the first enhanced service area.

Operation 3: After determining that the terminal device is allowed to access the first enhanced service area, the terminal device may send a notification message to the network node, where the notification message includes the information about the first enhanced service area, and the notification message is used to notify the network node that the terminal device enters the first enhanced service area.

After receiving the notification message, the network node obtains the information about the first enhanced service area from the notification message, and then determines whether the terminal device is allowed to access the first enhanced service area. A method for determining, by the network node, whether the terminal device is allowed to access the first enhanced service area is similar to the method for determining, by the terminal device, whether the terminal device is allowed to access the first enhanced service area in step 303. For details, refer to the foregoing descriptions. The details are not described herein again. It should be noted that the step of determining, by the network node, whether the terminal device is allowed to access the first enhanced service area is an optional step, and may not be performed.

Then, the network node sends a response message to the terminal device. When the network node determines that the terminal device is allowed to access the first enhanced service area, or when the step of determining, by the network node, whether the terminal device is allowed to access the first enhanced service area is not performed, the response message may carry information about the local network corresponding to the first enhanced service area.

Optionally, the information about the local network includes a name of the local network, a service continuity mode, and the like. The information about the local network may be configured on the network node, or may be obtained by the network node from another node (for example, the policy function node or an operation and maintenance center).

It should be noted that the notification message and the response message are merely examples, and a specific message name is not limited in this embodiment of this application. During specific application, the notification message and the response message may be dedicated messages, or may be messages belonging to the conventional technology.

After receiving the information about the local network corresponding to the first enhanced service area, the terminal device triggers establishment of a PDU session, to establish a connection to the local network corresponding to the first enhanced service area.

For a PDU session establishment procedure, refer to the conventional technology. Details are not described herein.

Operation 4: Before entering the first enhanced service area, the terminal device triggers establishment of a PDU session, to establish a connection to a data network. After the terminal device enters the first enhanced service area and determines that the terminal device is allowed to access the first enhanced service area, the terminal device sends a notification message to the network node, where the notification message includes the information about the first enhanced service area, and the notification message is used to notify the network node that the terminal device enters the first enhanced service area.

After receiving the notification message, the network node obtains the information about the first enhanced service area from the notification message, and then determines whether the terminal device is allowed to access the first enhanced service area. A method for determining, by the network node, whether the terminal device is allowed to access the first enhanced service area is similar to the method for determining, by the terminal device, whether the terminal device is allowed to access the first enhanced service area in step 303. For details, refer to the foregoing descriptions. The details are not described herein again. It should be noted that the step of determining, by the network node, whether the terminal device is allowed to access the first enhanced service area is an optional step, and may not be performed.

Then, the network node sends a response message to the terminal device.

Because the terminal device already has an established PDU session currently, after learning that the terminal device enters the first enhanced service area, the network node determines to add, for the existing PDU session, a local gateway node (the local gateway node may be referred to as a PDU session anchor (PSA)) corresponding to the first enhanced service area and an uplink classifier (UL CL) gateway node. In this way, data packets of the terminal device can be offloaded by the UL CL gateway node, where some data packets are distributed to an original gateway node, and the other data packets are distributed to the local gateway node (that is, the PSA). This achieves a traffic offloading objective.

For the operation of adding the local gateway node and the UL CL gateway node for the existing PDU session, refer to related descriptions in the conventional technology. Details are not described herein.

It should be noted that the notification message and the response message are merely examples, and a specific message name is not limited in this embodiment of this application. During specific application, the notification message and the response message may be dedicated messages, or may be messages belonging to the conventional technology.

Based on the foregoing solution, this embodiment of this application introduces the enhanced service area, and a network side only needs to send the information about the enhanced service area allowed to be accessed by the terminal device to the terminal device. Compared with the prior-art technical solution in which a plurality of tracking area identities are sent to the terminal device, this embodiment of this application has an advantage that the enhanced service area can well match a coverage range of an enterprise. Compared with the prior-art technical solution in which a plurality of cell identities are sent to the terminal device, this embodiment of this application has an advantage that overheads caused by sending the information about the enhanced service area to the terminal device are less than overheads caused by sending the cell identities to the terminal device. In addition, because a plurality of noncontiguous location areas of the same enterprise correspond to a same enterprise differentiator identifier, function complexity and signaling overheads are reduced.

Figure 4:
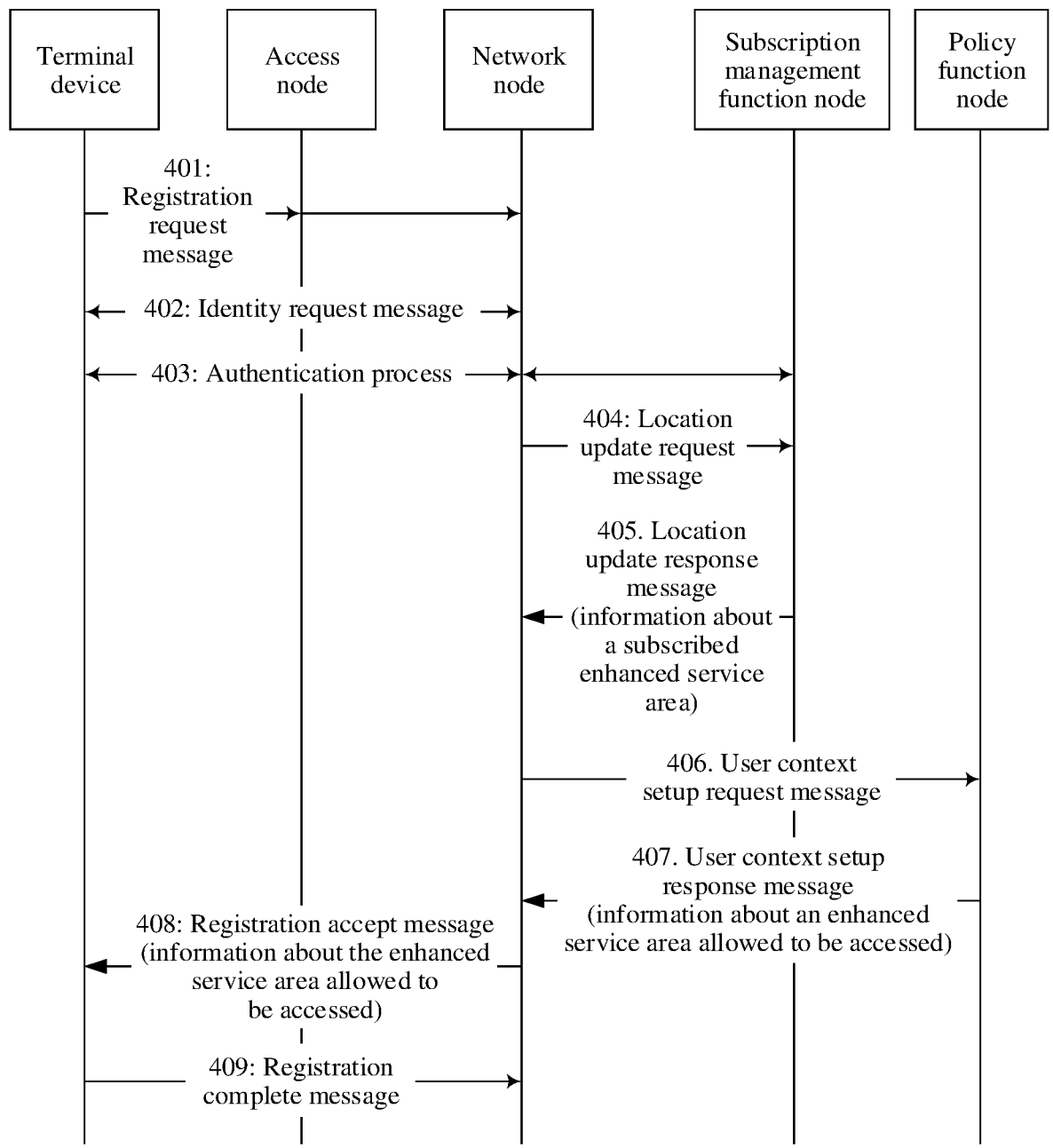
FIG. 4 is a schematic flowchart of a procedure in which a network node sends, to a terminal device in a registration procedure of the terminal device, information about an enhanced service area allowed to be accessed.

FIG. 4 is a schematic flowchart of a procedure in which a network node sends, to a terminal device in a registration procedure of the terminal device, information about an enhanced service area allowed to be accessed. The method includes the following steps.

Step 401: The terminal device initiates the registration procedure, and sends a registration request message to the network node, where the registration request message is forwarded by an access node.

Step 402: After the network node receives the registration request message, if the registration request message does not include a user identity, the network node sends an identity request to the terminal device, where the identity request is used to request to obtain the user identity.

The user identity may be an international mobile subscriber identification number (IMSI), a network access identifier (NAI), or the like.

Step 403: The network node authenticates the terminal device and checks validity of the terminal device.

Step 404: The network node sends a location update request message to a subscription management function node, where the location update request is used to obtain subscription data of the terminal device.

Step 405: The subscription management function node sends a location update response message to the network node, where the location update response message includes the subscription data of the terminal device.

Optionally, the subscription data includes information about an enhanced service area subscribed by the terminal device. The information about the subscribed enhanced service area includes information about one or more enhanced service areas. Information about an enhanced service area includes an enterprise differentiator identifier, and optionally includes one or more sub-area identities.

Step 406: The network node sends a user context setup request message to a policy function node, where the user context setup request message is used to request to obtain policy data of the terminal device.

Step 407: The policy function node sends a user context setup response message to the network node, where the user context setup response message includes the policy data of the terminal device.

Optionally, the policy data includes information about an enhanced service area allowed to be accessed by the terminal device. The information about the enhanced service area allowed to be accessed includes information about one or more enhanced service areas. Information about an enhanced service area includes an enterprise differentiator identifier, and optionally includes one or more sub-area identities.

Step 408: The network node sends a registration accept message to the terminal device.

The registration accept message includes the information about the enhanced service area allowed to be accessed.

In an implementation, the information that is about the enhanced service area allowed to be accessed and that is included in the registration accept message may be the same as the information about the subscribed enhanced service area in step 405, or the same as the information about the enhanced service area allowed to be accessed in step 407, or may be locally configured on the network node by an operator.

In another implementation, the information that is about the enhanced service area allowed to be accessed and that is included in the registration accept message may be an intersection of any two of the information about the subscribed enhanced service area in step 405, the information about the enhanced service area allowed to be accessed in step 407, or the locally configured information about the enhanced service area allowed to be accessed.

In still another implementation, the information that is about the enhanced service area allowed to be accessed and that is included in the registration accept message may be an intersection of the information about the subscribed enhanced service area in step 405, the information about the enhanced service area allowed to be accessed in step 407, and the locally configured information about the enhanced service area allowed to be accessed.

Step 409: The terminal device sends a registration complete message to the network node.

In the foregoing procedure, the information about the enhanced service area allowed to be accessed by the terminal device is sent to the terminal device by using the registration accept message.

Based on the network architecture shown in FIG. 1, an embodiment of this application provides another communication method. In the method, after a terminal device moves to a first area from a second area, the terminal device may determine that the terminal device has moved out of the second area, and perform a corresponding operation.

Figure 5:
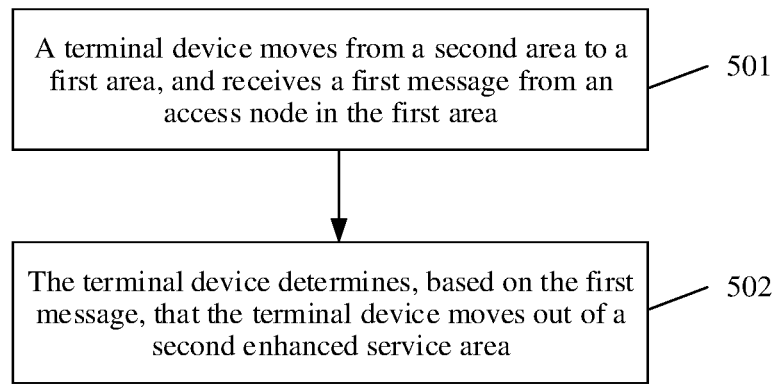
FIG. 5 is a schematic flowchart of another communication method according to an embodiment of this application.

As shown in FIG. 5, the method includes the following steps.

Step 501: The terminal device moves to the first area from the second area, and receives a first message from an access node in the first area.

The second area herein may be a cell in which the terminal device is located before the terminal device enters the first area, and the first area may be a cell in which the terminal device is currently located.

An enhanced service area corresponding to the second area may be referred to as a second enhanced service area.

The first area may correspond to an enhanced service area (for example, referred to as a first enhanced service area), or may not correspond to an enhanced service area.

The first message may be, for example, a system broadcast message.

Step 502: The terminal device determines, based on the first message, that the terminal device moves out of the second enhanced service area.

For example, if the first message does not include information about an enhanced service area, the terminal device determines that the terminal device moves out of the second enhanced service area. In an example, UE 1 is located in a Shenzhen branch of an enterprise AAA at a first time, and receives a first message at a second time, where the first message does not include information about any enhanced service area, and the second time is later than the first time. In this case, the UE 1 determines that the UE 1 has moved out of the Shenzhen branch of the enterprise AAA, and cannot access a data network of the Shenzhen branch of the enterprise AAA.

For another example, if the first message includes information about the first enhanced service area corresponding to the first area, and the information about the first enhanced service area does not match information about the second enhanced service area corresponding to the second area, the terminal device determines that the terminal device moves out of the second enhanced service area. The mismatching herein means that enterprise differentiator identifiers are different, or means enterprise differentiator identifiers are the same but sub-area identities are different. In an example, UE 2 is located in a Shenzhen branch of an enterprise AAA at a first time, and receives a first message at a second time, where the first message includes information about a first enhanced service area, and the second time is later than the first time. If the UE 2 determines that an enterprise differentiator identifier in the information about the first enhanced service area is different from an enterprise differentiator identifier in information about a second enhanced service area, the UE 2 determines that the UE 2 has moved out of the Shenzhen branch of the enterprise AAA, and cannot access a data network of the Shenzhen branch of the enterprise AAA. Further, the UE 2 may determine, based on the information about the first enhanced service area, that the UE 2 already enters the first enhanced service area.

After determining that the terminal device moves out of the second enhanced service area, the terminal device may perform a corresponding operation. The operation performed by the terminal device includes but is not limited to one or more of the following:

Operation 1: After determining that the terminal device moves out of the second enhanced service area, the terminal device may trigger deletion of a PDU session established in the second enhanced service area, and disconnect from a data network corresponding to the second enhanced service area.

For a PDU session deletion procedure, refer to the conventional technology. Details are not described herein.

Operation 2: When an application server needs to learn of the terminal device in the second enhanced service area, to perform an operation such as statistics collection on pedestrian flow in the second enhanced service area, statistics collection on a quantity of employees in the second enhanced service area, or service push to the terminal device in the second enhanced service area, after moving out of the second enhanced service area, the terminal device may send a notification message to the application server, where the notification message includes the information about the second enhanced service area, and the notification message is used to notify the application server that the terminal device moves out of the second enhanced service area.

Optionally, the terminal device may send a service data packet to the application server, where the service data packet carries the information about the second enhanced service area.

Operation 3: After determining that the terminal device moves out of the second enhanced service area, the terminal device may send a notification message to a network node, where the notification message includes the information about the second enhanced service area, and the notification message is used to notify the network node that the terminal device moves out of the second enhanced service area.

After receiving the notification message, the network node obtains the information about the second enhanced service area from the notification message, and then triggers deletion of a PDU session between the terminal device and a local data network, to remove a UL CL gateway node and a local gateway node.

Then, the network node sends a response message to the terminal device.

For the operation of removing the local gateway node and the UL CL gateway node, refer to related descriptions in the conventional technology. Details are not described herein.

Based on the foregoing solution, this embodiment of this application introduces the enhanced service area, and a network side only needs to send the information about the enhanced service area allowed to be accessed by the terminal device to the terminal device. Compared with the prior-art technical solution in which a plurality of tracking area identities are sent to the terminal device, this embodiment of this application has an advantage that the enhanced service area can well match a coverage range of an enterprise. Compared with the prior-art technical solution in which a plurality of cell identities are sent to the terminal device, this embodiment of this application has an advantage that overheads caused by sending the information about the enhanced service area to the terminal device are less than overheads caused by sending the cell identities to the terminal device. Because a plurality of noncontiguous location areas of the same enterprise correspond to a same enterprise differentiator identifier, function complexity and signaling overheads are reduced.

It should be noted that the foregoing Embodiment 3 and Embodiment 5 may be combined for implementation. For example, in another embodiment, after moving from a second area to a first area, a terminal device receives a first message (for example, a system broadcast message) sent by an access node, where the first message includes information about an enhanced service area corresponding to the first area. In this case, the terminal device determines, based on the first message, that the terminal device moves out of a second enhanced service area (for details, refer to the related descriptions in the embodiment corresponding to FIG. 5), and determines, based on information about an enhanced service area allowed to be accessed by the terminal device and information about a first enhanced service area, that the terminal device is allowed to access the first enhanced service area.

After determining that the terminal device moves out of the second enhanced service area, the terminal device may perform a corresponding operation. For details, refer to the related descriptions in the embodiment corresponding to FIG. 5.

After determining that the terminal device is allowed to access the first enhanced service area, the terminal device may perform a corresponding operation. For details, refer to the related descriptions in the embodiment corresponding to FIG. 3.

It should be noted that, when the terminal device determines that the terminal device moves out of the second enhanced service area and moves into the first enhanced service area, and determines that the terminal device is allowed to access the first enhanced service area, if an enterprise differentiator identifier in the information about the first enhanced service area is the same as an enterprise differentiator identifier in information about the second enhanced service area, it indicates that the terminal device moves from one branch to another branch of a same enterprise (for example, an enterprise sets up two branches in two adjacent areas). In this case, the terminal device may not need to perform a PDU session establishment or deletion operation. In other words, the terminal device keeps a PDU session established in the first enhanced service area.

It should be noted that, when the terminal device determines that the terminal device moves out of the second enhanced service area and moves into the first enhanced service area, and determines that the terminal device is allowed to access the first enhanced service area, the terminal device may send a notification message to an application server, where the notification message is used to notify that the terminal device moves out of the second enhanced service area and enters the first enhanced service area. Alternatively, the terminal device sends two notification messages to an application server, where one notification message is used to notify that the terminal device moves out of the second enhanced service area, and the other notification message is used to notify that the terminal device enters the first enhanced service area.

It should be noted that, when the terminal device determines that the terminal device moves out of the second enhanced service area and enters the first enhanced service area, and determines that the terminal device is allowed to access the first enhanced service area, the terminal device may send a notification message to a network node, where the notification message is used to notify that the terminal device moves out of the second enhanced service area and enters the first enhanced service area. Alternatively, the terminal device sends two notification messages to a network node, where one notification message is used to notify that the terminal device moves out of the second enhanced service area, and the other notification message is used to notify that the terminal device enters the first enhanced service area.

Based on any of the foregoing embodiments, the information about the enhanced service area allowed to be accessed by the terminal device may be configured on the network node, the policy function node, and the application server. Information about an enhanced service area and a corresponding cell identity or tracking area identity are configured on the access node. In addition, when a cell identity or a tracking area identity corresponding to information about an enhanced service area of an enterprise is updated, only a correspondence needs to be updated on the access node, and a new correspondence does not need to be sent to the terminal device, the network node, the policy function node, and the application server. This can reduce signaling overheads.

According to this solution, the network node, the policy function node, the application server, and the terminal device all need to learn of only the information about the enhanced service area, and do not need to learn of an actual corresponding cell identity or tracking area identity. This can avoid impact on the network node, the policy function node, the application server, and the terminal device when the cell identity or the tracking area identity corresponding to the enhanced service area is adjusted during wireless network planning. A correspondence between information about an enhanced service area and a cell identity or a tracking area identity is configured on the access node. The access node sends, to the terminal device through broadcasting, a cell identity of a cell in which the terminal device is currently located and information about an enhanced service area corresponding to the cell identity, and the terminal device may learn of the information about the enhanced service area corresponding to the area that the terminal device currently enters. This reduces signaling overheads and complexity.

In an example, one sub-area identity corresponds to one or more cell identities. It is assumed that an enterprise AAA has branches in Shenzhen, Shanghai, Nanjing, Beijing, Guangzhou, and Hangzhou, and an enterprise BBB has branches in Hong Kong, Guangzhou, Shanghai, and Sichuan.

In an example, at a first moment, the access node records the following cell identities corresponding to sub-area identities of the branches of the enterprises: {{AAA, Shenzhen}, {cell ID 1, cell ID 2}}; {{AAA, Shanghai}, {cell ID3, cell ID4}; {{AAA, Nanjing}, {cell ID5, cell ID 6}; {{AAA, Beijing}, {cell ID7, cell ID 8, cell ID9}; {{AAA, Guangzhou}, {cell ID 10}; {{AAA, Hangzhou}, {cell ID 11, cell ID 12}; {{BBB, Hong Kong}, {cell ID 13, cell ID 14, cell ID 15}; {{BBB, Guangzhou}, {cell ID 16, cell ID 17}; {{BBB, Shanghai}, {cell ID 18}; {{BBB, Sichuan}, {cell ID19, cell ID 20, cell ID 21, cell ID 22}.

To be specific, the sub-area identity of the Shenzhen branch of the enterprise AAA corresponds to the cell 1 and the cell 2, the sub-area identity of the Shanghai branch of the enterprise AAA corresponds to the cell 3 and the cell 4, the sub-area identity of the Nanjing branch of the enterprise AAA corresponds to the cell 5 and the cell 6, the sub-area identity of the Beijing branch of the enterprise AAA corresponds to the cell 7, the cell 8, and the cell 9, the sub-area identity of the Guangzhou branch of the enterprise AAA corresponds to the cell 10, and the sub-area identity of the Hangzhou branch of the enterprise AAA corresponds to the cell 11 and the cell 12. The sub-area identity of the Hong Kong branch of the enterprise BBB corresponds to the cell 13, the cell 14, and the cell 15, the sub-area identity of the Guangzhou branch of the enterprise BBB corresponds to the cell 16 and the cell 17, the sub-area identity of the Shanghai branch of the enterprise BBB corresponds to the cell 18, and the sub-area identity of the Sichuan branch of the enterprise BBB corresponds to the cell 19, the cell 20, the cell 21, and the cell 22.

For example, when cells corresponding to the Shenzhen branch of the enterprise AAA are updated to the cell 2 and a cell 23, and cells corresponding to the Shanghai branch of the enterprise BBB are updated to the cell 18 and a cell 24, the access node may make corresponding update, and after the update, at a second moment, the access node records the following cell identities corresponding to sub-area identities of the branches of the enterprises: {{AAA, Shenzhen}, {cell ID 2, cell ID 23}}; {{AAA, Shanghai}, {cell ID 3, cell ID 4}; {{AAA, Nanjing}, {cell ID 5, cell ID 6}; {{AAA, Beijing}, {cell ID 7, cell ID 8, cell ID 9}; {{AAA, Guangzhou}, {cell ID 10}; {{AAA, Hangzhou}, {cell ID 11, cell ID 12}; {{BBB, Hong Kong}, {cell ID 13, cell ID 14, cell ID 15}; {{BBB, Guangzhou}, {cell ID 16, cell ID 17}; {{BBB, Shanghai}, {cell ID 18, cell ID 24}; {{BBB, Sichuan}, {cell ID 19, cell ID 20, cell ID 21, cell ID 22}.

After the update, the sub-area identity of the Shenzhen branch of the enterprise AAA corresponds to the cell 2 and the cell 23, the sub-area identity of the Shanghai branch of the enterprise AAA corresponds to the cell 3 and the cell 4, the sub-area identity of the Nanjing branch of the enterprise AAA corresponds to the cell 5 and the cell 6, the sub-area identity of the Beijing branch of the enterprise AAA corresponds to the cell 7, the cell 8, and the cell 9, the sub-area identity of the Guangzhou branch of the enterprise AAA corresponds to the cell 10, and the sub-area identity of the Hangzhou branch of the enterprise AAA corresponds to the cell 11 and the cell 12; and the sub-area identity of the Hong Kong branch of the enterprise BBB corresponds to the cell 13, the cell 14, and the cell 15, the sub-area identity of the Guangzhou branch of the enterprise BBB corresponds to the cell 16 and the cell 17, the sub-area identity of the Shanghai branch of the enterprise BBB corresponds to the cell 18 and the cell 24, and the sub-area identity of the Sichuan branch of the enterprise BBB corresponds to the cell 19, the cell 20, the cell 21, and the cell 22.

The foregoing mainly describes the solutions provided in this application from a perspective of interaction between network elements. It should be understood that, in the foregoing implementations, to implement the foregoing functions, each network element includes a corresponding hardware structure and/or software module for implementing each function. A person skilled in the art should easily be aware that, in combination with the units and algorithm steps in the examples described in embodiments disclosed in this specification, the present invention may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of the present invention.

It should be understood that in the foregoing method embodiments, the steps or the operations that are implemented by the terminal device may also be implemented by a component (for example, a chip or a circuit) configured on the terminal device.

An embodiment of this application further provides an apparatus configured to implement any one of the foregoing methods, for example, an apparatus including units (or means) that are used to implement the steps performed by the terminal device in any one of the foregoing methods.

Figure 6:
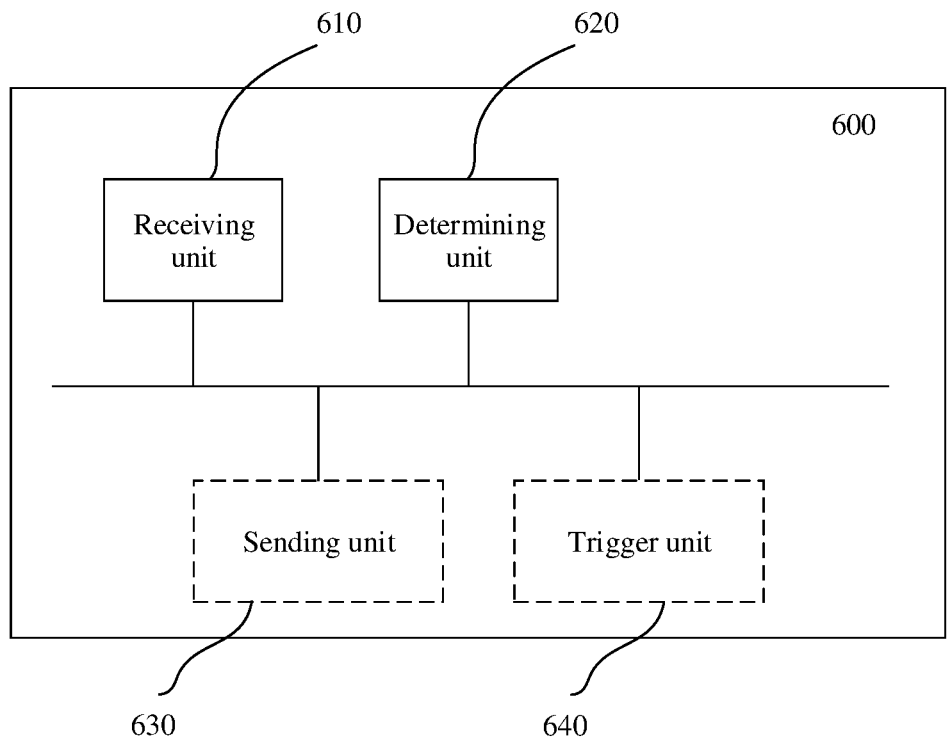
FIG. 6 is a schematic diagram of a communication apparatus according to an embodiment of this application.

FIG. 6 is a schematic diagram of a communication apparatus according to an embodiment of this application. The apparatus is configured to implement steps performed by a corresponding terminal device in the foregoing method embodiments. As shown in FIG. 6, the apparatus 600 includes a receiving unit 610 and a determining unit 620. Optionally, the apparatus further includes a sending unit 630 and a trigger unit 640.

The receiving unit 610 is configured to: receive information about an enhanced service area allowed to be accessed, where the information about the enhanced service area allowed to be accessed includes information about one or more enhanced service areas, and the information about the enhanced service area includes an enterprise differentiator identifier used to identify an enterprise; and receive information about a first enhanced service area corresponding to a first area from an access node after a terminal device enters the first area. The determining unit 620 is configured to determine, based on the information about the enhanced service area allowed to be accessed and the information about the first enhanced service area, that the terminal device is allowed to access the first enhanced service area.

In a possible implementation, the determining unit 620 is specifically configured to: when determining that the information about the first enhanced service area matches the information about the enhanced service area allowed to be accessed, determine that the terminal device is allowed to access the first enhanced service area.

In a possible implementation, that the information about the first enhanced service area matches the information about the enhanced service area allowed to be accessed includes: An enterprise differentiator identifier in the information about the first enhanced service area is the same as an enterprise differentiator identifier in information about at least one enhanced service area in the information about the enhanced service area allowed to be accessed.

In a possible implementation, the information about the enhanced service area further includes at least one sub-area identity, the sub-area identity is used to indicate a sub-area of an enterprise, and the information about the first enhanced service area further includes a first sub-area identity. That the information about the first enhanced service area matches the information about the enhanced service area allowed to be accessed includes: An enterprise differentiator identifier in the information about the first enhanced service area is the same as an enterprise differentiator identifier in information about at least one enhanced service area in the information about the enhanced service area allowed to be accessed, and the first sub-area identity is the same as a sub-area identity in the information about the at least one enhanced service area.

In a possible implementation, that the receiving unit 610 is configured to receive information about an enhanced service area allowed to be accessed specifically includes: receiving, from a network node in a registration procedure, an attach procedure, a location area update procedure, or a configuration update procedure of the terminal device, the information about the enhanced service area allowed to be accessed; receiving a user policy from a policy function node, where the user policy includes the information about the enhanced service area allowed to be accessed; or receiving a service data packet from an application server, where the service data packet includes the information about the enhanced service area allowed to be accessed.

In a possible implementation, the trigger unit 640 is configured to: after the determining unit 620 determines that the terminal device is allowed to access the first enhanced service area, trigger establishment of a protocol data unit PDU session, to establish a connection to a data network corresponding to the first enhanced service area.

In a possible implementation, the sending unit 630 is configured to: after the determining unit 620 determines that the terminal device is allowed to access the first enhanced service area, send a first notification message to the application server, where the first notification message includes the information about the first enhanced service area, and the first notification message is used to notify that the terminal device enters the first enhanced service area.

In a possible implementation, the sending unit 630 is configured to: after the determining unit 620 determines that the terminal device is allowed to access the first enhanced service area, send a second notification message to the network node, where the second notification message includes the information about the first enhanced service area, and the second notification message is used to notify that the terminal device enters the first enhanced service area. The receiving unit 610 is further configured to receive information about a local network corresponding to the first enhanced service area from the network node. The trigger unit 640 is configured to trigger establishment of a PDU session based on the information about the local network, to establish a connection to the local network corresponding to the first enhanced service area.

In a possible implementation, the terminal device is located in a second area before entering the first area, and the second area corresponds to information about a second enhanced service area. The determining unit 620 is further configured to determine that the terminal device moves out of the second enhanced service area based on the information about the first enhanced service area and the information about the second enhanced service area.

In a possible implementation, that the determining unit 620 is further configured to determine that the terminal device moves out of the second enhanced service area based on the information about the first enhanced service area and the information about the second enhanced service area specifically includes: when determining that the enterprise differentiator identifier in the information about the first enhanced service area is different from an enterprise differentiator identifier in the information about the second enhanced service area, determining that the terminal device moves out of the second enhanced service area; or when determining that the enterprise differentiator identifier in the information about the first enhanced service area is the same as an enterprise differentiator identifier in the information about the second enhanced service area, but a sub-area identity in the information about the first enhanced service area is different from a sub-area identity in the information about the second enhanced service area, determining that the terminal device moves out of the second enhanced service area.

In a possible implementation, the trigger unit 640 is configured to: after the determining unit 620 determines that the terminal device moves out of the second enhanced service area, trigger deletion of a PDU session established in the second enhanced service area, to disconnect from a data network corresponding to the second enhanced service area.

In a possible implementation, the sending unit 630 is configured to: after the determining unit 620 determines that the terminal device moves out of the second enhanced service area, send a third notification message to the application server and/or the network node, where the third notification message includes the information about the second enhanced service area, and the third notification message is used to notify that the terminal device moves out of the second enhanced service area.

In a possible implementation, information about one enhanced service area corresponds to one or more cell identities; or information about one enhanced service area corresponds to one or more tracking area identities.

It should be understood that the foregoing units may also be referred to as modules, circuits, or the like, and the foregoing units may be independently disposed, or may be all or partially integrated.

In some possible implementations, the sending unit 630 and the receiving unit 610 may alternatively be implemented via a transceiver unit. In other words, the sending unit 630 and the receiving unit 610 may be collectively referred to as a transceiver unit. The determining unit 620 and the trigger unit 640 may alternatively be implemented via a processing unit. In other words, the determining unit 620 and the trigger unit 640 may be collectively referred to as a processing unit.

The sending unit 630 and the receiving unit 610 or the transceiver unit may also be referred to as a communication interface, and the processing unit may also be referred to as a processor.

Optionally, the communication apparatus 600 may further include a storage unit. The storage unit is configured to store data or instructions (which may also be referred to as code or a program). The foregoing units may interact with or be coupled to the storage unit, to implement a corresponding method or function. For example, the processing unit may read data or instructions in the storage unit, to enable the communication apparatus to implement the method in the foregoing embodiments.

It should be understood that division of the foregoing apparatus into the units is merely logical function division. In an actual implementation, all or some of the units may be integrated into a physical entity, or may be physically separate. In addition, all the units in the apparatus may be implemented in a form of software invoked by a processing element, or may be implemented in a form of hardware; or some units may be implemented in a form of software invoked by a processing element, and some units may be implemented in a form of hardware. For example, each unit may be a separately disposed processing element, or may be integrated into a chip of the apparatus for implementation. In addition, each unit may alternatively be stored in a memory in a form of a program, and a processing element of the apparatus invokes the program to perform a function of the unit. In addition, all or some of the units may be integrated, or may be implemented independently. The processing element herein may also be referred to as a processor, and may be an integrated circuit having a signal processing capability. In an implementation process, the steps in the foregoing method or the foregoing units may be implemented by using a hardware integrated logic circuit in a processor element, or may be implemented in a form of software invoked by a processing element.

For example, a unit in any one of the foregoing apparatuses may be one or more integrated circuits configured to implement the foregoing methods, for example, one or more application-specific integrated circuits (ASICs), one or more microprocessors (digital signal processors, DSPs), one or more field programmable gate arrays (FPGAs), or a combination of at least two of the integrated circuits. For another example, when a unit in the apparatus may be implemented in a form of scheduling a program by a processing element, the processing element may be a general-purpose processor, for example, a central processing unit (CPU) or another processor that can invoke a program. For still another example, the units may be integrated and implemented in a form of a system-on-a-chip (SOC).

The foregoing unit for receiving (for example, the receiving unit) is an interface circuit of the apparatus, and is configured to receive a signal from another apparatus. For example, when the apparatus is implemented by a chip, the receiving unit is an interface circuit that is of the chip and that is configured to receive a signal from another chip or apparatus. The foregoing unit for sending (for example, the sending unit) is an interface circuit of the apparatus, and is configured to send a signal to another apparatus. For example, when the apparatus is implemented by a chip, the sending unit is an interface circuit that is of the chip and that is configured to send a signal to another chip or apparatus.

Figure 7:
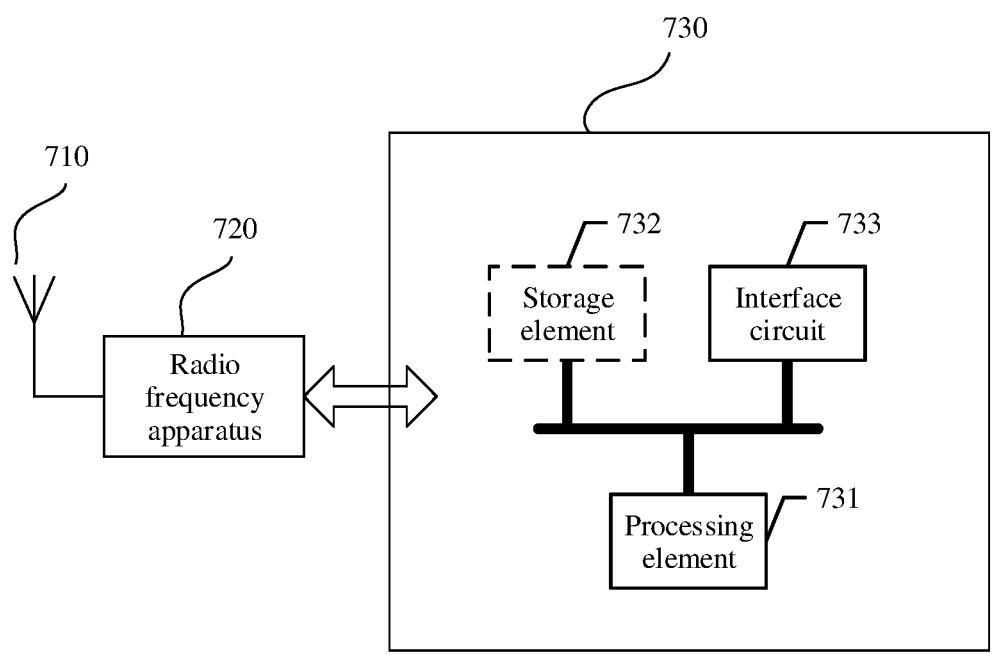
FIG. 7 is a schematic diagram of a terminal device according to an embodiment of this application.

FIG. 7 is a schematic diagram of a structure of a terminal device according to an embodiment of this application. The terminal device is configured to implement operations of the terminal device in the foregoing embodiments. As shown in FIG. 7, the terminal device includes an antenna 710, a radio frequency apparatus 720, and a signal processing pall 730. The antenna 710 is connected to the radio frequency apparatus 720. In a downlink direction, the radio frequency apparatus 720 receives, through the antenna 710, information sent by a network device, and sends, to the signal processing part 730 for processing, the information sent by the network device. In an uplink direction, the signal processing pall 730 processes information of the terminal device, and sends the information to the radio frequency apparatus 720. The radio frequency apparatus 720 processes the information of the terminal device, and then sends the processed information to the network device through the antenna 710.

The signal processing pall 730 is configured to process data at each communication protocol layer. The signal processing part 730 may be a subsystem of the terminal device. The terminal device may further include another subsystem, for example, a central processing subsystem, configured to implement processing at an operating system layer and an application layer of the terminal device; and for another example, a peripheral subsystem, configured to implement connection to another device. The signal processing part 730 may be a separately disposed chip. Optionally, the foregoing apparatus may be located in the signal processing part 730.

The signal processing part 730 may include one or more processing elements 731, for example, a main control CPU, another integrated circuit, and an interface circuit 733. In addition, the signal processing part 730 may further include a storage element 732. The storage element 732 is configured to store data and a program. A program used to perform the method performed by the terminal device in the foregoing methods may be stored in the storage element 732, or may not be stored in the storage element 732, for example, stored in a memory outside the signal processing part 730. When used, the signal processing part 730 loads the program into a buffer for use. The interface circuit 733 is configured to communicate with an apparatus. The foregoing apparatus may be located in the signal processing part 730. The signal processing part 730 may be implemented by a chip. The chip includes at least one processing element and an interface circuit. The processing element is configured to perform steps in any one of the foregoing methods performed by the terminal device. The interface circuit is configured to communicate with another apparatus. In an implementation, units that implement the steps in the foregoing methods may be implemented by a program invoked by a processing element. For example, the apparatus includes a processing element and a storage element. The processing element invokes a program stored in the storage element, to perform any method performed by the terminal device in the foregoing method embodiments. The storage element may be a storage element located on a same chip as the processing element, that is, an on-chip storage element.

In another implementation, a program used to perform the method performed by the terminal device in the foregoing methods may be stored in a storage element located on a different chip from the processing element, that is, an off-chip storage element. In this case, the processing element invokes or loads the program from the off-chip storage element to an on-chip storage element, to invoke and perform any method performed by the terminal device in the foregoing method embodiments.

In still another implementation, units of the terminal device that implement the steps in the foregoing methods may be configured as one or more processing elements. These processing elements are disposed in the signal processing part 730. The processing element herein may be an integrated circuit, for example, one or more ASICs, one or more DSPs, one or more FPGAs, or a combination of these types of integrated circuits. These integrated circuits may be integrated to form a chip.

Units that implement the steps in the foregoing methods may be integrated together and implemented in a form of an SOC, and the SOC chip is configured to implement the foregoing methods. At least one processing element and storage element may be integrated into the chip, and the processing element invokes a program stored in the storage element to implement the foregoing methods performed by the terminal device. Alternatively, at least one integrated circuit may be integrated into the chip, to implement the foregoing methods performed by the terminal device. Alternatively, the foregoing implementations may be combined. To be specific, functions of some units may be implemented by invoking a program by the processing element, and functions of some units may be implemented by the integrated circuit.

It can be learned that the foregoing apparatus may include at least one processing element and interface circuit. The at least one processing element is configured to perform any method performed by the terminal device provided in the foregoing method embodiments. The processing element may use a first manner, that is, invoke the program stored in the storage element, to perform some or all steps performed by the terminal device; or may use a second manner, that is, use a hardware integrated logic circuit in the processor element in combination with instructions, to perform some or all steps performed by the terminal device. Certainly, the processing element may use a combination of the first manner and the second manner, to perform some or all steps performed by the terminal device.

Likewise, the processing element herein may be a general-purpose processor, for example, a CPU, or may be one or more integrated circuits, for example, one or more ASICs, one or more microprocessors DSPs, one or more FPGAs, or a combination of at least two of these types of integrated circuits, configured to implement the foregoing methods. The storage element may be a memory, or may be a general term of a plurality of storage elements.

All or some of the foregoing embodiments may be implemented by using software, hardware, firmware, or any combination thereof. When software is used to implement the embodiments, all or a part of the embodiments may be implemented in a form of a computer program product. The computer program product includes one or more computer instructions. When the computer program instructions are loaded and executed on a computer, the procedures or functions according to embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, and microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

The various illustrative logical units and circuits described in embodiments of this application may implement or operate the described functions via a general-purpose processor, a digital signal processor, an application-specific integrated circuit (ASIC), a field programmable gate array (FPGA) or another programmable logical apparatus, a discrete gate or transistor logic, a discrete hardware component, or a design of any combination thereof. The general-purpose processor may be a microprocessor. Optionally, the general-purpose processor may alternatively be any conventional processor, controller, microcontroller, or state machine. The processor may alternatively be implemented by a combination of computing apparatuses, such as a digital signal processor and a microprocessor, a plurality of microprocessors, one or more microprocessors in combination with a digital signal processor core, or any other similar configuration.

In one or more example designs, the functions described in this application may be implemented by using hardware, software, firmware, or any combination thereof. If the functions are implemented by using software, these functions may be stored in a computer-readable medium or transmitted on a computer-readable medium in a form of one or more instructions or code. The computer-readable medium includes a computer storage medium or a communication medium that enables a computer program to move from one place to another place. The storage medium may be any available medium accessible by a general-purpose computer or a special computer. For example, such a computer-readable medium may include but is not limited to a RAM, a ROM, an EEPROM, a CD-ROM, or another optical disc storage, a disk storage or another magnetic storage apparatus, or any other medium that can be used to carry or store program code, where the program code is in an instruction form or a data structure form or in a form that can be read by a general-purpose or special computer or a general-purpose or special processor. In addition, any connection may be appropriately defined as a computer-readable medium. For example, if software is transmitted from a website, a server, or another remote resource by using a coaxial cable, an optical fiber computer, a twisted pair, a digital subscriber line (DSL) or in a wireless manner, such as infrared, radio, or microwave, the software is included in the defined computer-readable medium. The disk and the disc include a compact disc, a laser disc, an optical disc, a digital versatile disc (DVD), a floppy disk, and a Blu-ray disc. The disc usually copies data by using a magnetic means, and the disk optically copies data by using a laser means. The foregoing combination may also be included in the computer-readable medium.

A person skilled in the art should be aware that in the foregoing one or more examples, the functions described in this application may be implemented by using hardware, software, firmware, or any combination thereof. When the functions are implemented by software, the foregoing functions may be stored in a computer-readable medium or transmitted as one or more instructions or code in a computer-readable medium. The computer-readable medium includes a computer storage medium and a communication medium. The communication medium includes any medium that facilitates transmission of a computer program from one place to another. The storage medium may be any available medium accessible to a general-purpose or dedicated computer.

Although this application is described with reference to specific features and embodiments thereof, it is clear that various modifications and combinations may be made to them without departing from the spirit and scope of this application. Correspondingly, the specification and the accompanying drawings are merely example descriptions in this application defined by the appended claims, and are considered as any of or all modifications, variations, combinations, or equivalents that cover the scope of this application. It is clear that a person skilled in the art can make various modifications and variations to this application without departing from the scope of this application. This application is intended to cover these modifications and variations of this application provided that they fall within the scope of the following claims and their equivalent technologies.

What is claimed is:

1. A communication method, performed by a terminal device or a chip in the terminal device, comprising:
receiving information about one or more enhanced service areas, the information about the one or more enhanced service areas comprising one or more enterprise differentiator identifiers, each enterprise differentiator identifier corresponding to one of the one or more enhanced service areas;
receiving, after the terminal device enters a first area, information about a first enhanced service area corresponding to the first area from an access node, the information about the first enhanced service area comprising an enterprise differentiator identifier that is one of the one or more enterprise differentiator identifiers; and
determining that the terminal device is allowed to access the first enhanced service area based on the information about the one or more enhanced service areas and the information about the first enhanced service area,
wherein each of the one or more enterprise differentiator identifiers of the information about the one or more enhanced service areas identifies a different enterprise, each different enterprise covering at least one specific location area.

2. The method according to claim 1, wherein determining that the terminal device is allowed to access the first enhanced service area comprises:
when determining that the information about the first enhanced service area matches the information about the one or more enhanced service areas, determining that the terminal device is allowed to access the first enhanced service area.

3. The method according to claim 2, wherein determining that the information about the first enhanced service area matches the information about the one or more enhanced service areas comprises:
determining that the enterprise differentiator identifier in the information about the first enhanced service area is the same as one of the one or more enterprise differentiator identifiers in the information about the one or more enhanced service areas.

4. The method according to claim 2,
wherein the information about the one or more enhanced service areas comprises at least one sub-area identity, the at least one sub-area identity indicates a sub-area of an enterprise,
wherein the information about the first enhanced service area further comprises a first sub-area identity, and
wherein determining that the information about the first enhanced service area matches the information about the one or more enhanced service areas comprises:
determining that the enterprise differentiator identifier in the information about the first enhanced service area is the same as one of the one or more enterprise differentiator identifiers in the information about the one or more enhanced service areas, and the first sub-area identity is the same as a sub-area identity in the information about the one or more enhanced service areas.

5. The method according to claim 1, wherein receiving the information about the one or more enhanced service areas comprises:
receiving the information about the one or more enhanced service areas from a network node in a registration procedure, an attach procedure, a location area update procedure, or a configuration update procedure of the terminal device; or
receiving a user policy from a policy function node, wherein the user policy comprises the information about the one or more enhanced service areas; or
receiving a service data packet from an application server, wherein the service data packet comprises the information about the one or more enhanced service areas.

6. The method according to claim 1, further comprising:
triggering, after determining that the terminal device is allowed to access the first enhanced service area, establishment of a protocol data unit (PDU) session, to establish a connection to a data network corresponding to the first enhanced service area.

7. The method according to claim 1, further comprising:
sending, after determining that the terminal device is allowed to access the first enhanced service area, a first notification message to an application server, wherein the first notification message comprises the information about the first enhanced service area, and the first notification message is used to notify that the terminal device enters the first enhanced service area.

8. The method according to claim 1, wherein after determining that the terminal device is allowed to access the first enhanced service area, the method further comprises:
sending a second notification message to a network node, wherein the second notification message comprises the information about the first enhanced service area, and the second notification message is used to notify that the terminal device enters the first enhanced service area;
receiving, from the network node, information about a local network corresponding to the first enhanced service area; and
triggering establishment of a protocol data unit (PDU) session based on the information about the local network, to establish a connection to the local network corresponding to the first enhanced service area.

9. The method according to claim 1, wherein the terminal device is located in a second area before entering the first area, and the second area corresponds to information about a second enhanced service area; and
the method further comprises:
determining that the terminal device moves out of the second enhanced service area based on the information about the first enhanced service area and the information about the second enhanced service area.

10. The method according to claim 9, wherein determining that the terminal device moves out of the second enhanced service area based on the information about the first enhanced service area and the information about the second enhanced service area comprises:
when determining that the enterprise differentiator identifier in the information about the first enhanced service area is different from an enterprise differentiator identifier in the information about the second enhanced service area, determining that the terminal device moves out of the second enhanced service area; or
when determining that the enterprise differentiator identifier in the information about the first enhanced service area is the same as an enterprise differentiator identifier in the information about the second enhanced service area, but a sub-area identity in the information about the first enhanced service area is different from a sub-area identity in the information about the second enhanced service area, determining that the terminal device moves out of the second enhanced service area.

11. The method according to claim 9, wherein after determining that the terminal device moves out of the second enhanced service area, the method further comprises:
triggering deletion of a protocol data unit (PDU) session established in the second enhanced service area, to disconnect from a data network corresponding to the second enhanced service area.

12. The method according to claim 9, wherein after determining that the terminal device moves out of the second enhanced service area, the method further comprises:
sending a third notification message to an application server or a network node, wherein the third notification message comprises the information about the second enhanced service area, and the third notification message is used to notify that the terminal device moves out of the second enhanced service area.

13. An apparatus, comprising:
a processor coupled to a non-transitory memory storing instructions, the processor configured to execute the instructions to cause the apparatus to:
receive information about one or more enhanced service areas, the information about the one or more enhanced service areas comprising one or more enterprise differentiator identifiers, each enterprise differentiator identifier corresponding to one of the one or more enhanced service areas;
receive information about a first enhanced service area corresponding to a first area from an access node after the apparatus enters the first area, the information about the first enhanced service area comprising an enterprise differentiator identifier that is one of the one or more enterprise differentiator identifiers; and
determine, based on the information about the one or more enhanced service areas and the information about the first enhanced service area, that the apparatus is allowed to access the first enhanced service area,
wherein the apparatus is a terminal device or a chip in the terminal device, and
wherein each of the one or more enterprise differentiator identifiers of the information about the one or more enhanced service areas identifies a different enterprise, each different enterprise covering at least one specific location area.

14. The apparatus according to claim 13, wherein the instructions further cause the apparatus to:
determine that the apparatus is allowed to access the first enhanced service area when determining that the information about the first enhanced service area matches the information about the one or more enhanced service areas.

15. The apparatus according to claim 14, wherein the instructions to determine that the information about the first enhanced service area matches the information about the one or more enhanced service areas further cause the processor to:
determine that the enterprise differentiator identifier in the information about the first enhanced service area is the same as one of the one or more enterprise differentiator identifiers in the information about the one or more enhanced service areas.

16. The apparatus according to claim 14,
wherein the information about the one or more enhanced service areas further comprises at least one sub-area identity, the sub-area identity is used to indicate a sub-area of an enterprise,
wherein the information about the first enhanced service area further comprises a first sub-area identity, and
wherein the instructions to determine that the information about the first enhanced service area matches the information about the one or more enhanced service areas further cause the processor to:
determine that the enterprise differentiator identifier in the information about the first enhanced service area is the same as one of the one or more enterprise differentiator identifiers in the information about the one or more enhanced service areas, and the first sub-area identity is the same as a sub-area identity in the information about the one or more enhanced service areas.

17. The apparatus according to claim 13, wherein the instructions further cause the apparatus to:
receive, from a network node in a registration procedure, an attach procedure, a location area update procedure, or a configuration update procedure of the apparatus; or
receive a user policy from a policy function node, wherein the user policy comprises the information about the first enhanced service area allowed to be accessed; or
receive a service data packet from an application server, wherein the service data packet comprises the information about the one or more enhanced service areas.

18. The apparatus according to claim 13, wherein the instructions further cause the apparatus to:
after determining that the apparatus is allowed to access the first enhanced service area, send a first notification message to an application server, wherein the first notification message comprises the information about the first enhanced service area, and the first notification message is used to notify that the apparatus enters the first enhanced service area.

19. The apparatus according to claim 13, wherein the instructions further cause the apparatus to:
after determining that the apparatus is allowed to access the first enhanced service area, send a second notification message to a network node, wherein the second notification message comprises the information about the first enhanced service area, and the second notification message is used to notify that the apparatus enters the first enhanced service area;
receive information about a local network corresponding to the first enhanced service area from the network node; and trigger establishment of a protocol data unit (PDU) session based on the information about the local network, to establish a connection to the local network corresponding to the first enhanced service area.

20. The apparatus according to claim 13, wherein the information about the one or more enhanced service areas corresponds to one or more cell identities; or
the information about the one or more enhanced service areas corresponds to one or more tracking area identities.

* * * * *